Nov. 4, 1969 D. MEYER 3,477,040

CIRCUIT ARRANGEMENT FOR THE LINEAL CONTROL OF THE FREQUENCY OR PERIOD OF A SINE OSCILLATOR BY MEANS OF AN ELECTRIC QUALITY

Filed Sept. 11, 1967 2 Sheets-Sheet 1

INVENTOR.
DIETRICH MEYER

BY Frank R. Trifari

AGENT

INVENTOR.
DIETRICH MEYER
BY
Frank R. Trifari
AGENT

United States Patent Office 3,477,040
Patented Nov. 4, 1969

3,477,040

CIRCUIT ARRANGEMENT FOR THE LINEAL CONTROL OF THE FREQUENCY OR PERIOD OF A SINE OSCILLATOR BY MEANS OF AN ELECTRIC QUALITY

Dietrich Meyer, Hamburg, Germany, assignor, by mesne assignments, to U.S. Philips Corporation, New York, N.Y., a corporation of Delaware Filed Sept. 11, 1967, Ser. No. 666,608
Claims priority, application Germany, Sept. 10, 1966, P 40,365
Int. Cl. H03b 5/26
U.S. Cl. 331—141 13 Claims

ABSTRACT OF THE DISCLOSURE

A circuit for linearly varying the frequency of an oscillator in accordance with an input voltage. The oscillator includes an amplifier and a frequency determining feedback network composed of three identical photoresistors connected in a $\pi$ configuration. A first capacitor is connected in series with the input of the $\pi$ network and a second capacitor is connected across the output thereof. A control voltage is derived that is proportional to the sum of the resistances of the three photoresistors and is applied to one input of a difference amplifier. The input voltage is applied to a second input of the difference amplifier. The output of the difference amplifier controls a light source optically coupled to the photoresistors whereby the resistance thereof is varied to produce a null signal at the input of the difference amplifier. Thus, the resistance of the photoresistors is varied to produce a frequency variation of the oscillator that is a linear function of the input voltage.

The present invention relates to frequency controlled oscillators, and more particularly to a circuit arrangement for linearly controlling the frequency or period of a sine wave oscillator by means of an electric quantity, for example, voltage, current or resistance.

Circuit arrangements for controlling since wave oscillators by means of an electric quantity are known (cf Cecil F. Coale: Notes on Voltage-Turnable Nonlinear Resistance-Capacitance Networks; IEEE Transactions on Instrumentation and Measurement, vol. IM 13, Nos. 2 and 3, June and September 1964, pages 49–52). They may comprise, for example, RC or RL oscillators the resistances of which are a function of a light intensity, a temperature or a magnetic field, and the operative physical quantity being in turn controlled by an electric quantity.

Such devices have a limitation in that fundamentally the frequency produced in the oscillator does not exhibit a linear relationship to the control quantity. Furthermore, the conversion characteristic is often greatly influenced by environmental quantities.

It is an object of the present invention to provide a sine wave oscillator in which the frequency or period of of oscillation is a linear function of a controlling electric quantity, such as current, voltage, resistance, etc. Oscillators of this type have particular advantages when, for example, for the manipulation of a measured value an electric quantity, or another physical quantity converted into an electric quantity, is to be converted into a frequency or period proportional to the quantity concerned.

According to the invention, a known sine wave oscillator comprising an amplifier and a frequency-determining network made up of at least two controllable resistances and at least two similar reactances is provided with means for deriving an electric control quantity of the same kind as the electric quantity to be measured. The electric control quantity is derived from the sum of the controllable resistances. The circuit also includes means for compensating the electric quantity to be measured with the electric control quantity derived from the controllable resistances by variation of the controllable resistances.

Embodiments of the invention will now be described, by way of example, with reference to the accompanying diagrammatic drawings, in which.

To illustrate the operation of oscillators according to the invention, we will first consider a known circuit arrangement for controlling the oscillation frequency of a sine wave oscillator by means of a measured quantity $x$.

Figure 1:
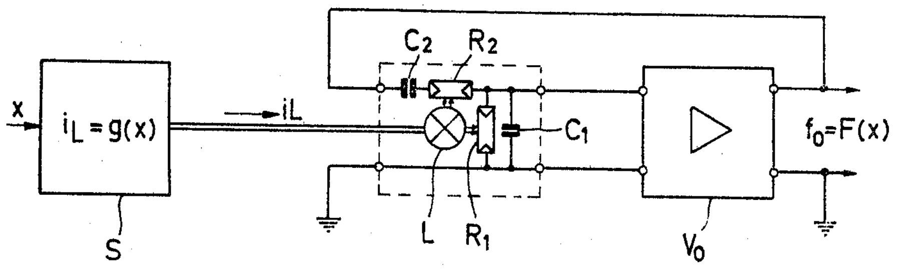
FIGURE 1 is a block-schematic diagram of a known controllable RC oscillator.

FIGURE 1 shows as an example of such a circuit arrangement a RC oscillator comprising an amplifier $V_o$ and a passive feedback network $R_1$, $R_2$, $C_1$, $C_2$. The resistances $R_1$ and $R_2$ are photoresistances which are illuminated equally by an electric filament lamp L. Thus the resistance values of the resistors $R_1$ and $R_2$ are a function of the lamp current $i_L$ $$R_1, R_2=f(i_L) \quad (1)$$

which through a device S is controlled by the quantity $x$ to be measured:

$$i_L=g(x) \quad (1a)$$

As is known, the frequency $f_o$ of a RC oscillator of the kind described is:

$$f_o=\frac{1}{2\pi\sqrt{R_1R_2C_1C_2}} \quad (2)$$

Therefore, by controlling the resistances $R_1$ and $R_2$, and with the use of Equations 1 and $1a$, the following equation is obtained.

$$f_o=\frac{1}{2\pi\sqrt{C_1C_2}}\cdot\frac{1}{f[g(x)]}=F(x) \quad (3)$$

Since in controllable oscillators the conversion function according to Equation 3 always includes the control characteristics of, for example, electronically, optically or magnetically variable resistances, which characteristics are highly nonlinear and dependent upon the ambient parameters, these oscillators cannot be used for measuring purposes.

This disadvantage is obviated by an oscillator according to the invention the operation of which will now be described with reference to an embodiment shown in FIGURE 2. The oscillator proper comprises an amplifier $V_o$ and a frequency-determining feedback network $R_1$, $R_2$, $R_3$, $C_1$, $C_2$ which is separately shown in FIGURE 3 and has the resonant frequency:

$$f_o=\frac{1}{T_o}=\frac{1}{2\pi}\sqrt{\frac{R_1+R_2+R_3}{R_1R_2R_3C_1C_2}} \quad (4)$$

This network has the property that the frequency-determining resistances $R_1$, $R_2$ and $R_3$ form a closed direct current path. In the embodiment of FIGURE 2, this path is interrupted by the interposition of a capacitor $C_k$ that acts as an alternating-current short-circuit, which enables the series combination of the three resistances to be measured between terminals 1 and 2. If, now, a constant direct current $i_q$ supplied by a current source Q connected to the terminals 1 and 2 flows through this direct-current path, the voltage $u_{\Sigma R}$ across the terminals 1 and 2 is a measure only of the sum of the three resistances $R_1$, $R_2$ and $R_3$, since the alternating currents at the frequency produced in the oscillator, which also flow in the network, are short-circuited between the terminals 1 and 2 by the capacitor $C_k$.

If the three resistances are equal $$R_1=R_2=R_3=R \quad (5a)$$

we have $$u_{\Sigma R}=i_q(R_1+R_2+R_3)=k_1R \quad (5b)$$

where $k_1$ is a constant.

According to Equation 4 the period $T_o$ of the resonant frequency $f_o$ in the case of equality of the three resistances (*5a*) is $$T_o=2\pi R\sqrt{\frac{C_1C_2}{3}}=k_2R \quad (6)$$

where $k_2$ is a constant.

According to Equations *5b* and 6, $u_{\Sigma R}$ is in linear relationship with the period $$u_{\Sigma R}=\frac{k_1}{k_2}\cdot T_o \quad (7)$$

If the period of the oscillator is to be controlled, for example, by means of an arbitrary predetermined voltage $u_x$, the resistances $R_1$, $R_2$ and $R_3$ must be adjusted, while retaining the condition (*5a*), so that $u_{\Sigma R}$ becomes equal to $u_x$. This is achieved by means of a control circuit comprising a difference amplifier $V_R$. The input quantity to the difference amplifier is the difference voltage $$\Delta u=u_{\Sigma R}-u_x$$

The output of the difference amplifier controls a source of light L which influences the controllable resistances $R_1$, $R_2$ and $R_3$, which in this example are photoresistors. If the amplification of the amplifier $V_R$ is large enough, an extremely small difference voltage $\Delta u$ is sufficient to control the photoresistors by means of the light flux. Thus the control circuit enforces $$\lim V_r-\infty U_{\Sigma R}=u_x \quad (8)$$

Hence, together with Equation 7 we have $$T_o=\frac{k_2}{k_1}\cdot u_x \quad (9)$$

This solves the problem which the invention has set out to solve, i.e. how to make the relationship between the period and the quantity to be measured linear and fundamentally independent of nonlinearities in the control system and of environmental parameters influencing the control system.

The fact that in practice the condition of Equation *5a* can only be satisfied with some tolerances influences the conversion characteristic of Equation 9 only to a second order approximation. A computation of the error shows that it is permissible for the resistance values $R_1$, $R_2$ and $R_3$ to lie in a tolerance field range about 8% wide with respect to a mean resistance without the relative deviation of the period according to Equation 9 exceeding 0.1%.

Figure 2:
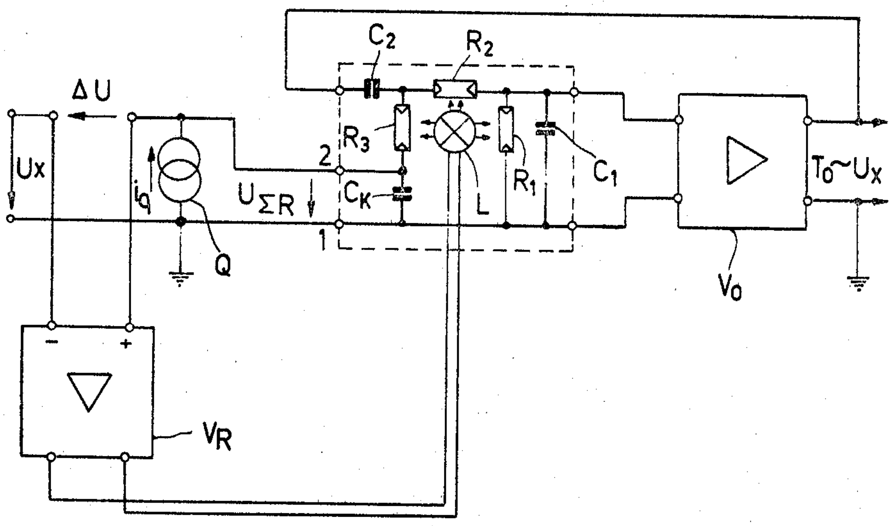
FIGURE 2 is a block-schematic diagram of a first embodiment of an oscillator according to the invention.
Figure 3:
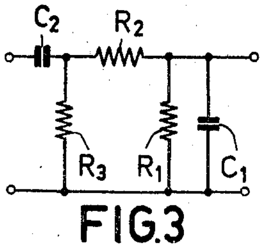
FIGURE 3 is a known frequency-determining RC network.
Figure 4:
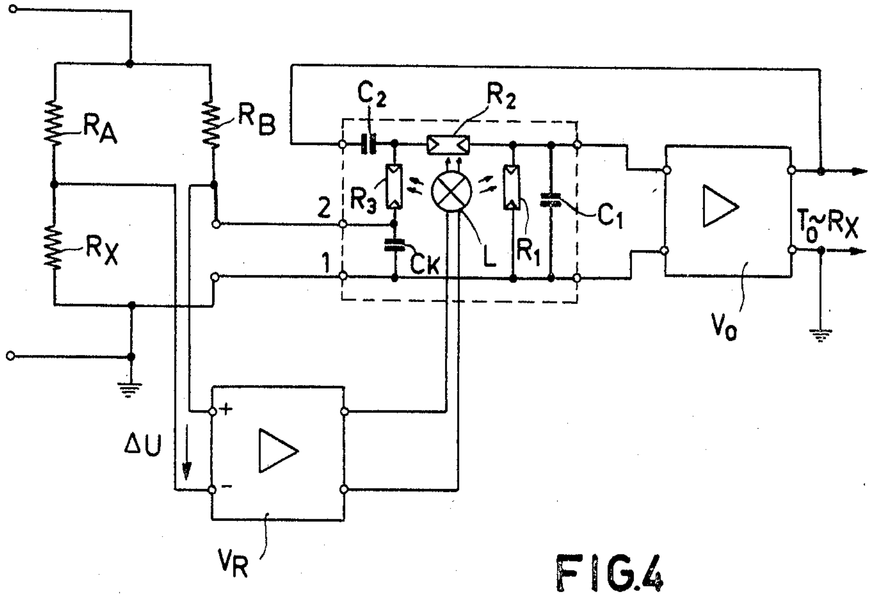
FIGURE 4 is a block-schematic diagram of a second embodiment of an oscillator according to the invention.

FIGURE 4 shows, by way of example, another embodiment of an oscillator according to the invention, which comprises an oscillator amplifier $V_o$, a frequency-determining network $R_1$, $R_2$, $R_3$, $C_1$, $C_2$, $C_K$ similar to that of the embodiment shown in FIGURE 2, a resistance measuring bridge made up of the resistance $R_x$ to be measured, of two further bridge resistances $R_A$ and $R_B$ and of the series combination of the frequency-determining resistances $R_1$, $R_2$ and $R_3$ as the fourth bridge resistance, and a control circuit which corresponds to that shown in FIGURE 2. By controlling the resistances $R_1$, $R_2$ and $R_3$, which may be photoresistors, the control circuit insures that the resistance bridge is balanced to $\Delta u\rightarrow 0$. In the balanced condition $$\frac{R_x}{R_A}=\frac{R_1+R_2+R_3}{R_B} \quad (10)$$

From this and Equation 5 we get $$R=\frac{R_B}{R_A}\frac{1}{3}\cdot R_x=\frac{R_x}{k_3} \quad (11)$$

where $k_3$ is a constant.

This equation combined with Equation 6 shows a linear dependence of the period $T_o$ upon the resistance $R_x$ to be measured $$T_o=\frac{k_2}{k_3}\cdot R_x \quad (12)$$

Figure 5:
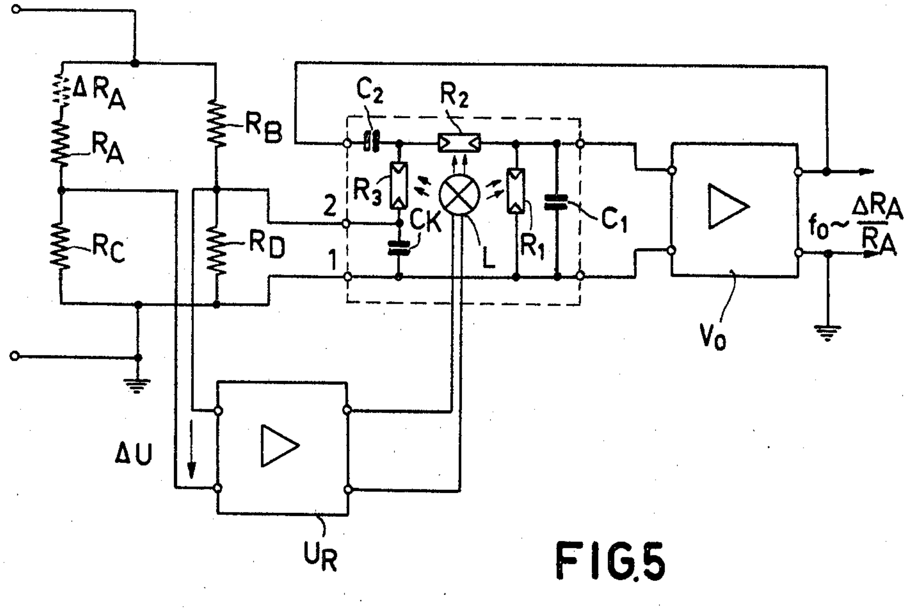
FIGURE 5 is a block-schematic diagram of a third embodiment of an oscillator according to the invention.

FIGURE 5 shows an embodiment of an arrangement according to the invention for converting a very small resistance variation into a large frequency variation. The arrangement comprises a resistance measuring bridge made up of resistances $R_A$, $R_B$, $R_C$ and $R_D$, an oscillator amplifier $V_o$, and a frequency-determining feedback network $R_1$, $R_2$, $R_3$, $C_1$, $C_2$, $C_k$. The series combination of the three resistances $R_1$, $R_2$ and $R_3$ is connected in parallel with one of the bridge resistances, for example, with $R_D$. A control device, which corresponds to that shown in FIGURE 2, controls photoresistors $R_1$, $R_2$ and $R_3$ so that, in the balanced condition of the resistance bridge, $\Delta u\rightarrow 0$.

Let it be assumed that, in the absence of the resistances connected in parallel with $R_D$, the bridge is balanced. If now, for example, $R_A$ is increased, by a relative resistance variation, by a factor $\Delta R_A/R_A$, the balanced condition of the bridge can only be restored by connecting a relative resistance value $R_D/R_p$ in parallel with $R_D$ in a manner such that $$\frac{R_D}{R_p}=\frac{\Delta R_A}{R_A} \quad (13)$$

This parallel combination comprises the resistance $R_D$ and the series combination of the resistances $R_1$, $R_2$ and $R_3$, which are so controlled by the control device that $$R_1+R_2+R_3=R_p \quad (14)$$

Hence, while satisfying the condition of Equation *5a*, Equation 13 becomes $$\frac{1}{R}=\frac{3}{R_p}=\frac{3}{R_D}\frac{\Delta R_A}{R_A}=k_4\frac{\Delta R_A}{R_A} \quad (15)$$

where $k_4$ is a constant.

From Equation 15, together with Equation 6, we finally have $$f_o=\frac{1}{T_o}=\frac{k_4}{k_2}\frac{\Delta R_A}{R_A} \quad (16)$$

Unlike the arrangement shown in FIGURE 4, in which an *absolute* resistance value $R_x$ is converted into a proportional oscillation period, by means of the arrangement shown in FIGURE 5 a *relative* resistance variation $\Delta R_A/R_A$ also may be converted into a proportional frequency. A suitable choice of the constants enables a very small absolute resistance variation to be converted into a large frequency variation.

Besides the bridge arrangements described, there are obviously other possible bridge arrangements in which a variation in the value of one of the other bridge resistances, which in the embodiment described are constant, or a variation in the values of several bridge resistances, results in a frequency variation. In these cases the linear relationship is subject to an error, but this is negligible for relatively small resistance variations.

Further possible embodiments of arrangements according to the invention may be obtained by replacing the frequency-determining capacitance—in the embodiments described the capacitors $C_1$ and $C_2$—by inductances. The resulting frequency-determining networks exhibit a reciprocal behaviour to that of frequency-determining networks made up of capacitances and ohmic resistances.

Besides the photoelectronic control of the frequency-determining resistance $R_1$, $R_2$ and $R_3$ as used in the embodiments described, other kinds of control are possible, for example, mechanical, magnetic or electronic controls.

Furthermore, frequency-determining networks may be used in which the frequency-determining capacitances or inductances are the frequency-determining ohmic resistances are interchanged. In the resulting arrangements capacitances or inductances must be controlled instead of ohmic resistances, as is the case in the embodiments described hereinbefore. This may be effected by means of nonlinear capacitors adapted to be biassed and nonlinear choke coils adapted to be premagnetized. Accordingly, in order to compensate the quantity to be measured, a similar quantity must be derived from the sum of the controlled reactances. This may be effected in a manner similar to that used in the embodiment shown in FIGURE 2. The direct-current source must then be replaced by an alternating-current source having a frequency that is different from the frequency of the alternating voltage produced in the oscillator so the $U_{\Sigma R}$ is an alternating voltage. Correspondingly, capacitor $C_K$ must be replaced by an element which is a short circuit for the oscillator frequency $f_0$ but a high resistance for the frequency of the alternating-current source, for example, a parallel resonant circuit tuned to the later frequency.

What is claimed is:

1. A sine wave oscillator in which the frequency or the period varies linearly as a function of an electric quantity comprising, an amplifier, a frequency-determining network coupled to said amplifier and comprising at least two controllable resistance elements and at least two reactance elements of the same kind, means for deriving an electric control quantity of the same kind as the electric quantity to be measured and proportional to the sum of the controllable resistances, and means jointly responsive to the measured electric quantity and to said electric control quantity for varying said controllable resistances so as to compensate the electric quantity to be measured with the electric control quantity derived from the controllable resistances.

2. A sine wave oscillator as claimed in claim 1 wherein the frequency-determining network comprises three controllable resistance elements connected as a $\pi$ section having input and output terminals, a first capacitor connected in parallel with the controllable resistance that is connected between the output terminals, and a second capacitor connected in series with the input terminals.

3. A sine wave oscillator as claimed in claim 1 wherein said reactance elements comprise inductors.

4. A sine wave oscillator as claimed in claim 1 wherein the means for deriving an electric control quantity from the sum of the controllable resistances includes a capacitor that acts as an alternating-current short circuit, and means connecting said capacitor in the circuit constituted by the frequency-determining resistances so that the electric control quantity proportional to the sum of the frequency-determining resistances appears at the terminals of the capacitor.

5. A sine wave oscillator as claimed in claim 1 wherein said resistance varying means comprises a difference amplifier having input terminals for receiving said measured electric quantity and said electric control quantity and output terminals for supplying an output signal that controls the controllable resistances.

6. A sine wave oscillator as claimed in claim 1 wherein the controllable resistances are photoresistors and said resistance varying means includes an electrically controllable source of light optically coupled to said photoresistors to control the resistance thereof.

7. A sine wave oscillator as claimed in claim 1 further comprising a bridge circuit having first, second and third impedance elements in the first, second and third arms thereof, respectively, means connecting said controllable resistance elements in the fourth arm of said bridge circuit, and means connecting the output of said bridge circuit to the input of said resistance varying means.

8. A sine wave oscillator as claimed in claim 7 wherein said resistance varying means includes a difference amplifier having input terminals connected to the output of said bridge circuit, and said controllable resistance elements comprise photoresistors, said oscillator further comprising an electrically controllable source of light connected to the output terminals of the difference amplifier and optically coupled to the photoresistors to control the resistance thereof as a function of the light intensity.

9. An oscillator having a linear frequency response as a function of an electric signal comprising, an amplifier, a feedback network intercoupling the amplifier input and output for controlling the oscillator frequency, said network comprising at least two reactance elements of the same kind and at least two controllable impedance elements of the same kind, means for deriving a first control signal that is proportional to the sum of the impedances of said controllable impedance elements, means for comparing said electric signal and said control signal to produce a second control signal that is proportional to the difference voltage at the input of said comparing means, and means responsive to said second control signal for simultaneously varying the impedance of said controllable impedance elements so as to adjust said first control signal to substantially compensate said electric signal.

10. An oscillator as claimed in claim 9 wherein said controllable impedance elements comprise photosensitive resistors connected in said feedback network so that the oscillator frequency varies in a linear relationship with the resistance of said photosensitive resistors, and wherein said impedance varying means comprises a light source optically coupled to said photosensitive resistors.

11. An oscillator as claimed in claim 10 wherein said photosensitive resistors are substantially identical and each individually exhibit a non-linear control characteristic, and means connecting said photosensitive resistors together in said feedback network so as to form a closed direct current path across which said first control signal is derived.

12. An oscillator as claimed in claim 10 wherein said photosensitive resistors comprise three identical resistors connected in a $\pi$ network and said reactance elements comprise first and second capacitors connected across the output of said $\pi$ network and in series with the input of said $\pi$ network, respectively.

13. An oscillator as claimed in claim 9 wherein said control signal deriving means includes a source of direct current connected in series with said controllable impedance elements.

References Cited

UNITED STATES PATENTS 3,378,788 4/1968 Barber ............ 331—110

JOHN KOMINSKI, Primary Examiner

U.S. Cl. X.R.

331—177; 333—70